(12) United States Patent
Kagami et al.

(10) Patent No.: US 12,157,412 B1
(45) Date of Patent: Dec. 3, 2024

(54) VEHICLE DISPLAY DEVICE

(71) Applicant: TOYOTA JIDOSHA KABUSHIKI KAISHA, Toyota (JP)

(72) Inventors: Ayaka Kagami, Inazawa (JP); Fumihiko Mouri, Owariasahi (JP); Kento Nakazato, Tama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/743,109

(22) Filed: Jun. 14, 2024

(30) Foreign Application Priority Data

Sep. 14, 2023 (JP) .................. 2023-149592

(51) Int. Cl.
*B60Q 1/30* (2006.01)
*B60Q 1/38* (2006.01)

(52) U.S. Cl.
CPC ............... *B60Q 1/30* (2013.01); *B60Q 1/38* (2013.01); *B60Q 2400/20* (2013.01); *B60Q 2400/50* (2013.01)

(58) Field of Classification Search
CPC .. B60Q 1/2696–3015; B60Q 1/38–387; B60Q 2400/20; B60Q 2400/50
See application file for complete search history.

(56) References Cited

U.S. PATENT DOCUMENTS

| | | | |
|---|---|---|---|
| 9,964,950 | B2 | 5/2018 | Takano |
| 10,017,116 | B2 | 7/2018 | Sato |
| 10,310,508 | B2 | 6/2019 | Kunisa et al. |
| 10,452,930 | B2 | 10/2019 | Sato |
| 10,663,973 | B2 | 5/2020 | Hashimoto et al. |
| 10,895,875 | B2 | 1/2021 | Hashimoto et al. |
| 11,001,198 | B2 | 5/2021 | Morimura et al. |
| 11,275,382 | B2 | 3/2022 | Hashimoto et al. |
| 2021/0229598 | A1 | 7/2021 | Morimura et al. |
| 2021/0380124 | A1 | 12/2021 | Urano et al. |
| 2023/0107328 | A1 | 4/2023 | Mori et al. |

FOREIGN PATENT DOCUMENTS

| | | |
|---|---|---|
| JP | 2009-021132 A | 1/2009 |
| JP | 2023-055108 A | 4/2023 |

*Primary Examiner* — Jason M Han
(74) *Attorney, Agent, or Firm* — SoraIP, Inc.

(57) ABSTRACT

A vehicle display device includes a visible light source that repeatedly turns on and off and emits visible light, an invisible light source that emits invisible light, and a projection unit that projects visible light emitted from the visible light source and invisible light emitted from the invisible light source onto a road surface as a drawing pattern.

4 Claims, 5 Drawing Sheets

VEHICLE DISPLAY DEVICE

CROSS-REFERENCE TO RELATED APPLICATION

This application claims priority to Japanese Patent Application No. 2023-149592 filed on Sep. 14, 2023, incorporated herein by reference in its entirety.

BACKGROUND

1. Technical Field

The present disclosure relates to vehicle display devices.

2. Description of Related Art

A vehicle display device that draws a notification display on a road surface in a direction of travel of a vehicle by using light has been conventionally known in the art (see, for example, Japanese Unexamined Patent Application Publication No. 2023-055108 (JP 2023-055108 A)). This vehicle display device sometimes makes the notification display flash on and off.

SUMMARY

However, in the case where a perception device configured to perceive the surroundings of a host vehicle perceives a drawing pattern projected on a road surface, there are timings the drawing pattern is off when the drawing pattern is flashing (repeatedly on and off). In this case, the drawing pattern may not be able to be accurately perceived by the perception device.

An object of the present disclosure is to provide a vehicle display device that allows a perception device to accurately perceive a drawing pattern projected on a road surface even when the drawing pattern is flashing.

In order to achieve the above object, a vehicle display device according to a first aspect of the present disclosure includes: a visible light source configured to repeatedly turn on and off to emit visible light; an invisible light source configured to emit invisible light; and a projection unit configured to project, as a drawing pattern, the visible light emitted from the visible light source and the invisible light emitted from the invisible light source onto a road surface.

According to the disclosure of the first aspect, the visible light source repeatedly turns on and off. In other words, the visible light source flashes on and off. Therefore, when the light emitted from the visible light source is projected as a drawing pattern onto a road surface by the projection unit, the drawing pattern flashes on and off. However, the invisible light source is on while the visible light source is off. Accordingly, there is no moment the drawing pattern to be perceived by the perception device is off, so that the drawing pattern can be accurately perceived by the perception device.

A vehicle display device according to a second aspect of the present disclosure is the vehicle display device according to the first aspect in which the invisible light source may turn on at timings when the visible light source turns off, and the visible light source may turn on at timings when the invisible light source turns off.

According to the disclosure of the second aspect, the invisible light source turns on at timings when the visible light source turns off, and the visible light source turns on at timings when the invisible light source turns off. Accordingly, there is no moment the drawing pattern to be perceived by the perception device is off, so that the drawing pattern can be accurately perceived by the perception device. Moreover, this configuration reduces excessive heat generation compared to the case where the invisible light source is constantly on.

A vehicle display device according to a third aspect of the present disclosure is the vehicle display device according to the first aspect in which the invisible light source may be on only while the visible light source is off.

According to the disclosure of the third aspect, the invisible light source is on only while the visible light source is off. This configuration reduces excessive heat generation compared to the case where the invisible light source is constantly on.

A vehicle display device according to a fourth aspect of the present disclosure is the vehicle display device according to the second or third aspect in which when a vehicle is traveling at a predetermined speed or higher, the invisible light source may not turn on even when the visible light source is off.

According to the disclosure of the fourth aspect, when the vehicle is traveling at the predetermined speed or higher, the invisible light source does not turn on even when the visible light source is off. That is, when the vehicle is traveling at the predetermined speed or higher, no drawing pattern will be projected onto the road surface, and it is therefore not necessary to turn on the invisible light source. This can save power of a battery of the vehicle.

A vehicle display device according to a fifth aspect of the present disclosure is the vehicle display device according to any one of the first to fourth aspects in which the visible light source and the invisible light source may be mounted on a common substrate.

According to the disclosure of the fifth aspect, the visible light source and the invisible light source are mounted on a common substrate. This configuration can reduce the number of components and thus the manufacturing cost compared to the case where the visible light source and the invisible light source are mounted on separate substrates.

As described above, according to the present disclosure, a drawing pattern projected on a road surface can be accurately perceived by the perception device even when the drawing pattern is flashing.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1A:
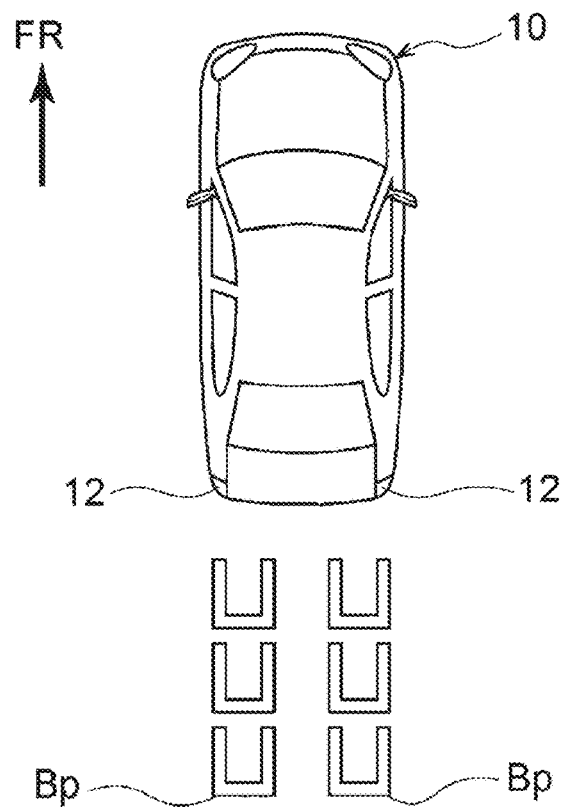
FIG. 1A is a schematic plan view illustrating a drawing pattern when a vehicle including a vehicle display device according to an embodiment of the present disclosure moves backward.

Hereinafter, an embodiment according to the present disclosure will be described in detail with reference to the drawings. For convenience of explanation, an arrow UP shown in the drawings is defined as a vehicle upward direction, an arrow FR is defined as a vehicle forward direction, an arrow RE is defined as a vehicle rearward direction, and an arrow RH is defined as a vehicle rightward direction. Therefore, in the following description, when the vertical, front-rear, and left-right directions are described without special mention, it is assumed that the vertical direction of the vehicle, the front-rear direction of the vehicle front-rear direction, and the left-right direction (vehicle width direction) of the vehicle are indicated.

Figure 1B:
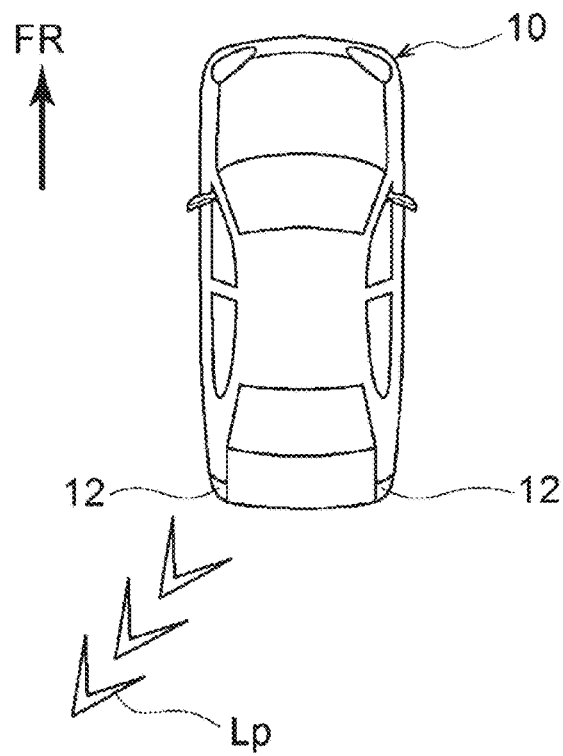
FIG. 1B is a schematic plan view showing a drawing pattern when a vehicle including a vehicle display device according to an embodiment of the present disclosure turns left while moving backward.

As shown in FIGS. 1A and 1B, the road surface drawing lamp unit 20 (see FIG. 2) as a vehicle display device according to the present embodiment is provided in each of the rear lamps 12 on the left and right sides of an autonomous vehicle (hereinafter simply referred to as "vehicle") 10 equipped with a driving support system having at least a collision damage reduction support function and an autonomous parking support function.

A predetermined (for example, substantially "U" shaped in plan view with the opening side facing the front side) drawing pattern Bp (see FIG. 1A) is projected (drawn) on the road surface around the rear side of the vehicle 10 by the light emitted from the road surface drawing lamp units 20 on both the left and right sides. Drawing pattern Bp, at the time of parking or the like of the vehicle 10, when the vehicle 10 is straight backward displays the traveling direction.

A predetermined drawing pattern Lp (for example, substantially "V" shaped in plan view with the opening side facing the right front side) (see FIG. 1B) is projected (drawn) on the road surface around the rear left side of the vehicle 10 by the light emitted from the road surface drawing-lamp unit 20 on the left side. The drawing pattern Lp indicates the traveling direction of the vehicle 10, for example, when the vehicle 10 turns leftward while traveling backward at the time of parking of the vehicle.

Figure 2:
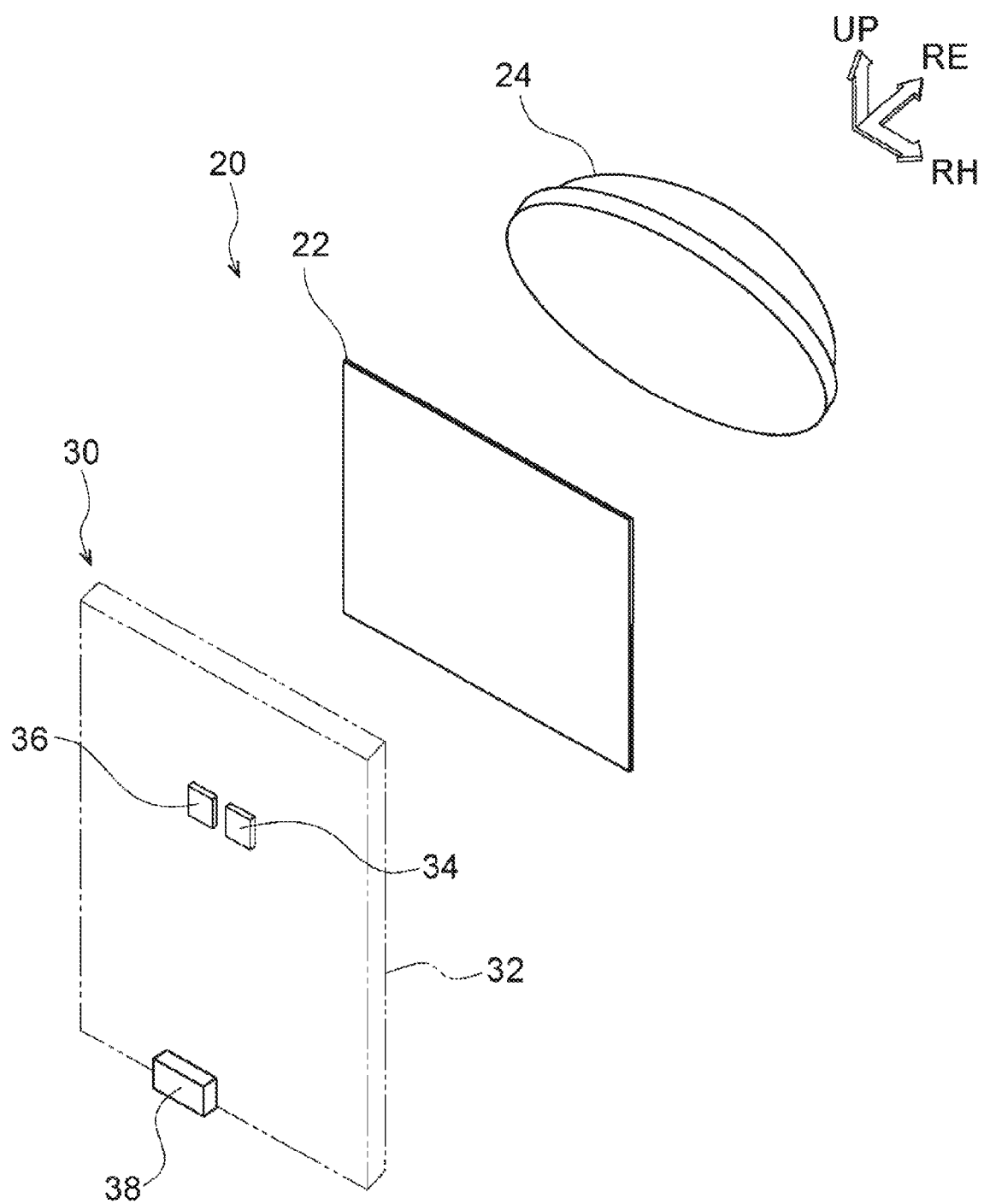
FIG. 2 is a schematic perspective view showing a configuration of a vehicle display device according to the present embodiment.

As shown in FIG. 2, the road surface drawing lamp unit 20 includes a light irradiation device 30 and a shade 22 that blocks a part of the light irradiated from the light irradiation device 30, thereby forming a drawing pattern Bp for backward movement as shown in FIG. 1A, a drawing pattern Lp for leftward bending as shown in FIG. 1B, and the like. The road surface drawing lamp unit 20 includes a projection lens 24 that transmits light that is not shielded by the shade 22 and projects the light on the road surface. The shade 22 and the projection lens 24 constitute a "projection unit".

The light irradiation device 30 includes a unit substrate 32, a visible light source 34 attached to a substantially central portion on the surface (one surface) of the unit substrate 32, and an invisible light source 36 attached to a substantially central portion on the surface (one surface) of the unit substrate 32 so as to be adjacent to the visible light source 34 in the left-right direction. Further, the light irradiation device 30 has a connector 38 that is attached to the lower end portion of the rear surface (the other surface) of the unit substrate 32 and to which a power cable (not shown) for supplying electric power to the visible light source 34 and the invisible light source 36 is connected.

Note that the connector 38 is not limited to a configuration that is attached to the lower end portion of the back surface (the other surface) of the unit substrate 32. The connector 38 may be attached to, for example, a side portion on the back surface (the other surface) of the unit substrate 32 or a lower end portion on the front surface (the one surface) of the unit substrate 32. In addition, the visible light source 34 and the invisible light source 36 may be mounted on the opposite sides of the illustrated one.

Further, the material of the common unit substrate 32 to which the visible light source 34 and the invisible light source 36 are attached together is not particularly limited, and aluminum, copper, ceramics, and the like are exemplified as examples. The visible light source 34 and the invisible light source 36 are not particularly limited as long as they are high-brightness light sources, and examples thereof include a light-emitting diode (LED: Light Emitting Diode), a semiconductor laser (LD: Laser Diode), and the like.

Figure 3:
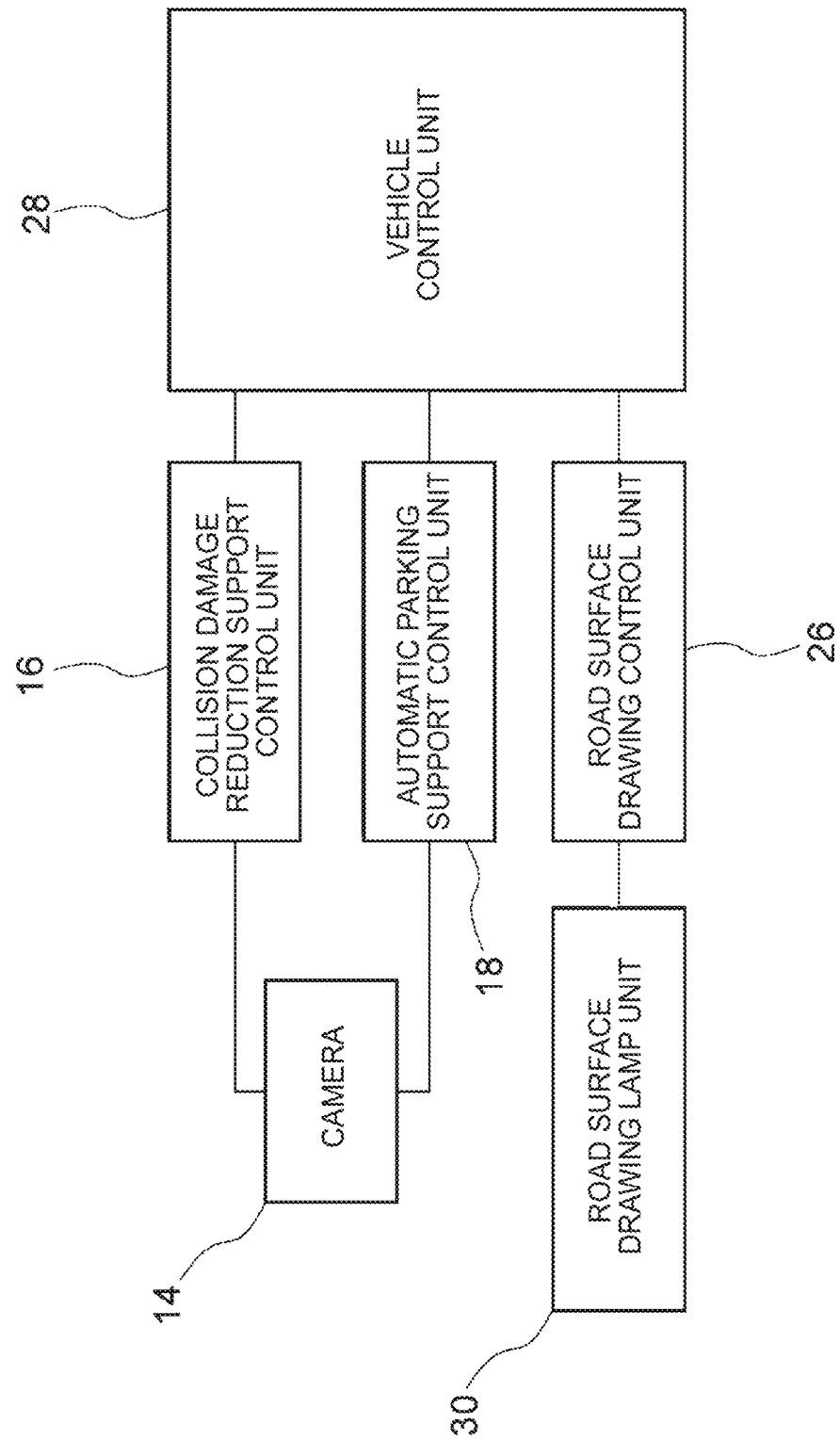
FIG. 3 is a block diagram illustrating a configuration of a driving support system including a vehicle display device according to the present embodiment.

As shown in FIG. 3, the road surface drawing lamp unit 20 is electrically connected to the road surface drawing control unit 26, and the road surface drawing control unit 26 is electrically connected to a vehicle control unit 28 that comprehensively controls the operation of the vehicle 10. The road surface drawing control unit 26 controls turning on and off of the visible light source 34 and turning on and off of the invisible light source 36 according to an instruction from the vehicle control unit 28, and turns on and off the visible light source 34 and the invisible light source 36 alternately.

Figure 5:
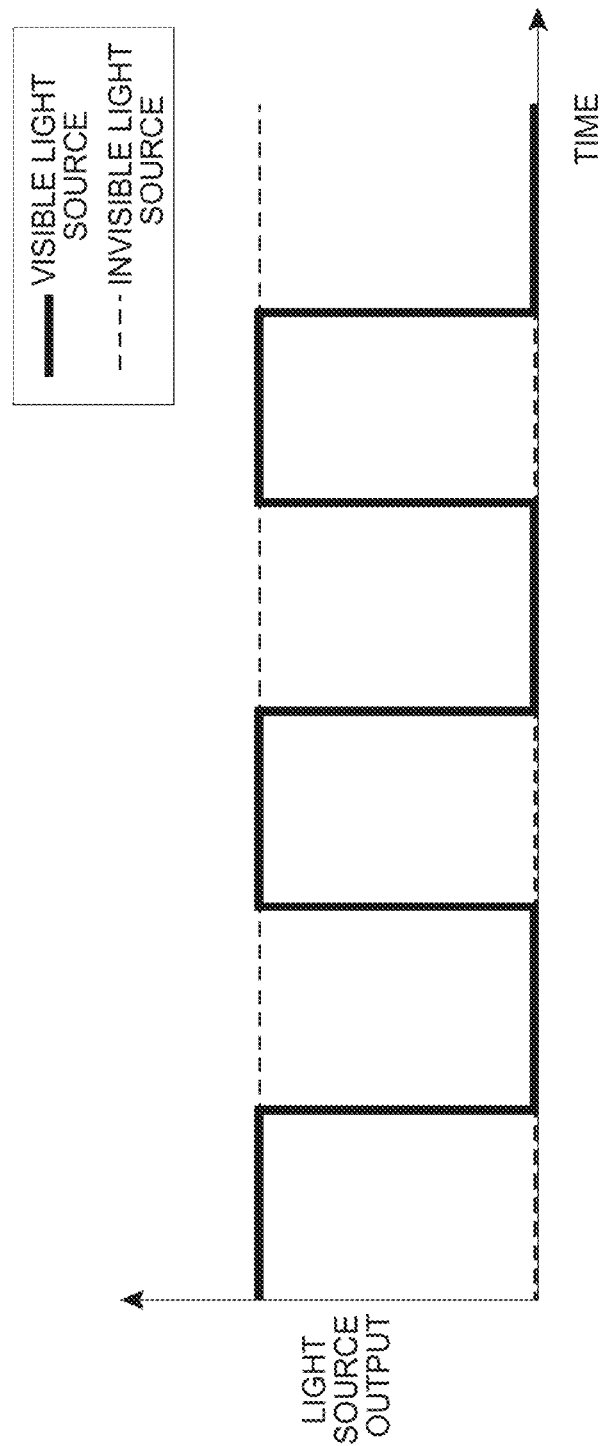
FIG. 5 is a graph showing timings at which a visible light source and an invisible light source of the vehicle display device according to the present embodiment are turned on and off.

That is, as shown in FIG. 5, the invisible light source 36 is controlled by the road surface drawing control unit 26 so as to automatically turn on at a timing when the visible light source 34 is turned off. As shown in FIG. 5, the visible light source 34 is controlled by the road surface drawing control unit 26 so as to automatically turn on at timings when the invisible light source 36 turns off. As described above, the road surface drawing control unit 26 controls energization of the visible light source 34 and the invisible light source 36 so that the invisible light source 36 is on only while the visible light source 34 is off. The visible light source 34 and the invisible light source 36 alternately turn on and off at predetermined timings without delay.

Figure 4:
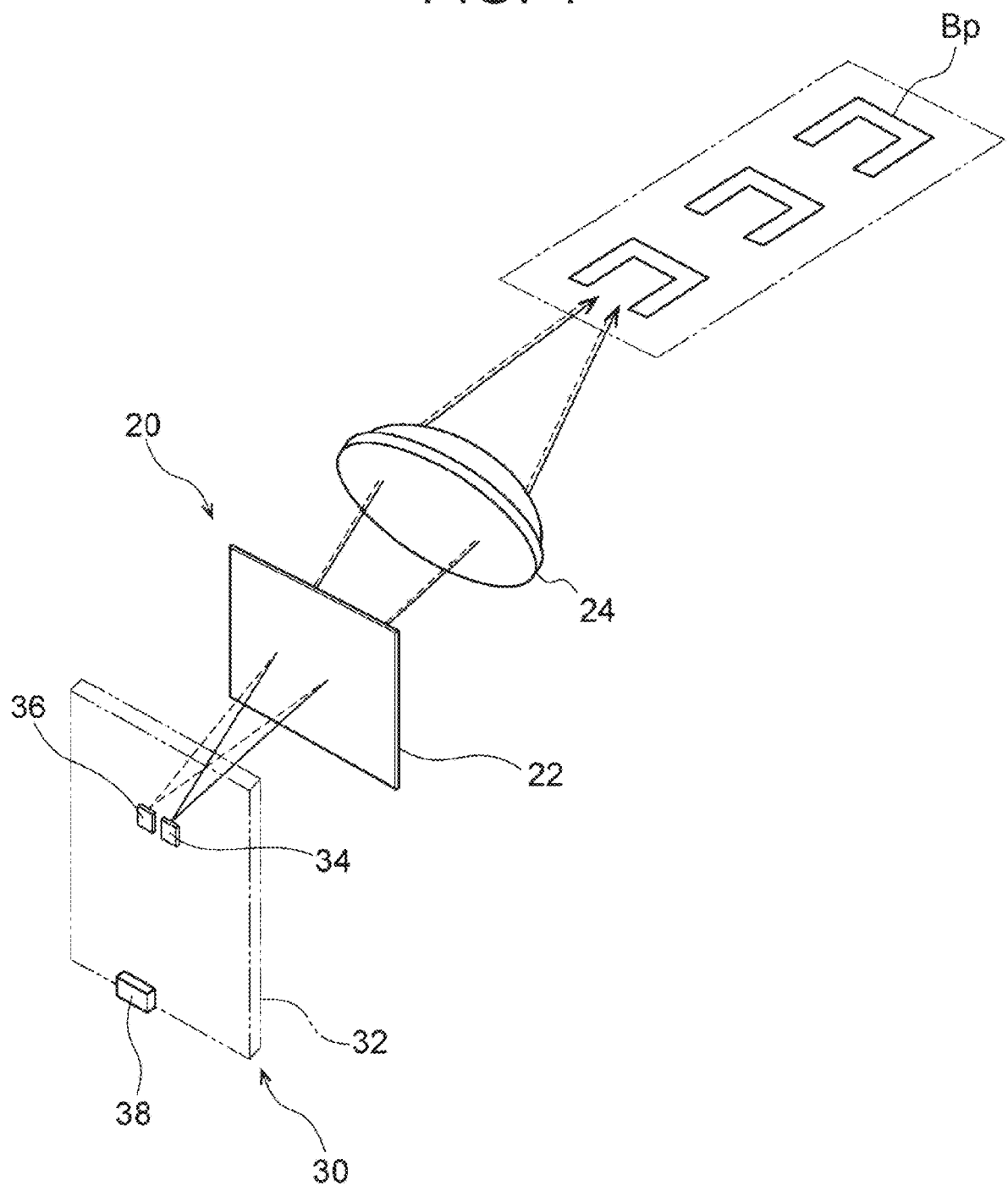
FIG. 4 is a schematic perspective view showing a case where a drawing pattern is projected when the vehicle display device according to the present embodiment moves backward.

Therefore, the visible light source 34 and the invisible light source 36 will not be on together. For example, as shown in FIG. 4, when the drawing pattern Bp is projected (drawn) on a road surface, there are two types: a case where the drawing pattern is projected (drawn) only by visible light emitted from the visible light source 34, and a case where the drawing pattern is projected (drawn) only by invisible light emitted from the invisible light source 36.

The road surface drawing control unit 26 controls the invisible light source 36 not to turn on even if the visible light source 34 is off when the speed of the vehicle 10 is equal to or higher than a predetermined speed, for example, equal to or higher than 16 km/h at which the automatic parking assistance function is disabled. That is, when the speed of the vehicle 10 is equal to or higher than the predetermined speed, both the visible light source 34 and the invisible light source 36 can be off together.

As shown in FIG. 3, the vehicle 10 (refer to FIGS. 1A and 1B) is provided with a camera 14 as a perception device (image perception sensor) that constantly perceives (monitors) the surroundings of the vehicle 10. The camera 14 is electrically connected to the collision damage reduction support control unit 16 and the automatic parking support control unit 18, and the collision damage reduction support control unit 16 and the automatic parking support control unit 18 are also electrically connected to the vehicle control unit 28, respectively.

The camera 14 can perceive both visible light and invisible light. Therefore, even if the visible light source 34 and the invisible light source 36 alternately turn on, the drawing pattern Bp, the drawing pattern Lp, and the like projected (drawn) on the road surface are perceived by the camera 14 as being constantly (continuously) projected. Since only visible light is visible and invisible light is not visible to the naked eye of the occupant (human being), the drawing pattern Bp or the drawing pattern Lp projected (drawn) on the road surface appears to be blinking.

The collision damage reduction support control unit 16 and the automatic parking support control unit 18 are set so as to perceive the surroundings of the vehicle 10 captured (detected) by the camera 14 by excluding the drawing pattern Bp, the drawing pattern Lp, and the like projected (drawn) on the road surface in advance. That is, when the drawing pattern Bp, the drawing pattern Lp, or the like is projected (drawn) on the road surface, there is a possibility that the driving assistance system cannot accurately perceive the condition of the road surface, the presence or absence of a pedestrian, or the like. As a result, there is a possibility that the accuracy of the driving support system side may be deteriorated or malfunction may be caused.

Therefore, in the collision damage reduction support control unit 16 and the automatic parking support control unit 18, a range in which the drawing pattern Bp, the drawing pattern Lp, or the like is projected (drawn) is set as a perception-exclusion target range in the driving support system. However, since the projection range of the drawing pattern Bp, the drawing pattern Lp, or the like is wide, if the wide range is set as the perception-exclusion target range, there is a possibility that a decrease in the accuracy of the driving support system cannot be avoided due to a shortage of the acquired data by the camera 14.

In particular, when there is a wall etc. in the surroundings of a parking space, such as around the parking space, the drawing pattern Bp, the drawing pattern Lp, or the like is projected (drawn) onto the wall etc., so that there is a possibility that erroneous perception may occur at a place outside the perception exclusion target area. Therefore, in the present embodiment, the drawing pattern Bp, the drawing pattern Lp, and the like can be set to the perception-exclusion target area even when the drawing pattern Bp, the drawing pattern Lp, and the like projected (drawn) on the wall or the like are captured (detected) by the camera 14 by causing the driving support system to learn the features of the shapes such as the drawing pattern Bp and the drawing pattern Lp.

As described above, in the present embodiment, even if the drawing pattern Bp, the drawing pattern Lp, and the like are projected (drawn) on the road surface, the driving support operation (driving support system) controlled by the collision damage reduction support control unit 16 and the automatic parking support control unit 18 is not affected. In other words, it is possible to suppress or prevent a decrease in accuracy or a malfunction on the driving support system side.

Next, the operation of the road surface drawing lamp unit 20 as the vehicle display device according to the present embodiment configured as described above will be described. Here, the case where the vehicle 10 is automatically parked (when the automatic parking assistance is executed) will be described, but the present disclosure is not limited thereto.

When the vehicle 10 is automatically parked (when the automatic parking assistance is executed), the camera 14 detects the condition of the road surface around the vehicle 10, and the steering wheel, the accelerator, and the brake are automatically operated under the control of the automatic parking support control unit 18 and the vehicle control unit 28. When the camera 14 detects a pedestrian in the traveling direction of the vehicle 10 (for example, a pedestrian behind the vehicle 10 during backward travel), a warning sound is generated or a brake is automatically operated under the control of the collision damage reduction support control unit 16 and the vehicle control unit 28.

At that time, under the control of the vehicle control unit 28 and the road surface drawing control unit 26, the road surface drawing lamp unit 20 projects (draws) a drawing pattern indicating the traveling direction of the vehicle 10 onto the road surface. The drawing pattern indicating the traveling direction of the vehicle 10 is, for example, a drawing pattern Bp for displaying straight backward movement, as shown in FIGS. 1A and 4, or a drawing pattern Lp for displaying leftward bending while backward movement, as shown in FIG. 1B.

Here, the collision damage reduction support control unit 16 and the automatic parking support control unit 18 set the drawing pattern Bp, the drawing pattern Lp, and the like as the perception-exclusion target area. Therefore, even if the drawing pattern Bp, the drawing pattern Lp, or the like is projected (drawn) on the road surface, it is possible to suppress or prevent a decrease in accuracy and a malfunction of the driving support system. This assumes that the drawing pattern Bp, the drawing pattern Lp, and the like are constantly projected (drawn).

However, the drawing pattern Bp, the drawing pattern Lp, or the like is intended to be particularly safe at night, and therefore may blink in conjunction with a turn lamp, a hazard lamp, or the like. Specifically, the blinking of the drawing pattern Bp or drawing pattern Lp, like a turn lamp or a hazard lamp, for example 0. It is repeated in cycles of about 33 seconds. Therefore, there is a possibility that the processing on the driving assistance system side including the camera 14 does not catch up with this cycle.

Especially at night, in order to obtain a stable camera image, it is necessary to secure a time (exposure time) for taking light into the image sensor of the camera 14. However, if the light is turned on only every 0.33 seconds, the frame rate, which is the number of images that can be acquired in one second, decreases, so that the shortage of processing on the driving support system side including the camera 14 becomes conspicuous, and the perception speed of the driving support system with respect to the surroundings of the vehicle 10 decreases.

Therefore, in the present embodiment, as described above, the visible light source 34 and the invisible light source 36 are alternately turned on. That is, the road surface drawing control unit 26 controls energization of the visible light source 34 and the invisible light source 36 so that the invisible light source 36 is on only while the visible light source 34 is off. The visible light source 34 and the invisible light source 36 are alternately turned on and off at predetermined timings without delay.

According to this, with the naked eye of the occupant (human being), the drawing pattern Bp, the drawing pattern Lp, and the like appear to be projected only when the visible light source 34 is turned on. However, in the camera 14, even when the visible light source 34 is turned off, since the invisible light source 36 is turned on at that time, the drawing pattern Bp, the drawing pattern Lp, and the like are captured as being constantly projected (so that there is no moment of disappearance at all).

That is, the camera 14 can continue to accurately and appropriately perceive the drawing pattern Bp, the drawing pattern Lp, and the like at all times regardless of whether the visible light source 34 is turned on or off. Therefore, even if the drawing pattern Bp, the drawing pattern Lp, or the like projected on the road surface is blinking when viewed by the naked eye of the occupant, it is possible to reliably suppress or prevent deterioration in accuracy and malfunction of the driving assistance system.

The road surface drawing control unit 26 prevents the invisible light source 36 from being turned on even if the visible light source 34 is turned off when the vehicle 10 is traveling at a predetermined velocity (e.g., an hour speed 16 km) or more. That is, when the vehicle 10 is traveling at a predetermined speed or higher, the drawing pattern Bp, the drawing pattern Lp, or the like is not projected onto the road surface, and therefore, the invisible light source 36 does not need to be turned on. Therefore, it is possible to reduce the power consumption of the battery in the vehicle 10.

In the road surface drawing lamp unit 20 according to the present embodiment, the visible light source 34 and the invisible light source 36 are mounted on a common unit substrate 32. Therefore, compared to the case where the visible light source 34 and the invisible light source 36 are mounted on separate unit substrates (not shown), it is possible to reduce the number of components and reduce the manufacturing cost. Since both the visible light source 34 and the invisible light source 36 are not turned on (since the invisible light source 36 is not continuously turned on), excessive heat generation can be suppressed in the unit substrate 32.

When the vehicle 10 is parked while moving forward or backward, only one of the left and right turn lamps of the vehicle is flashed. In other words, the turn lamps on the left and right sides are turned off. Therefore, there is a possibility that the amount of light is insufficient on the other side of either of the left and right sides, the frame rate of the camera 14 is lowered, and the perception speed of the driving support system side is lowered.

Therefore, only the invisible light source 36 may be constantly turned on the other side of either one of the left and right sides, and the invisible light may be utilized as the auxiliary light of the camera 14. This makes it possible to improve the perception speed of the camera 14 even when it becomes difficult for the camera 14 to perceive the surroundings in darkness such as at night.

The road surface drawing lamp unit 20 as the vehicle display device according to the present embodiment has been described above with reference to the drawings. The road surface drawing lamp unit 20 according to the present embodiment is not limited to the illustrated one, and can be appropriately changed in design without departing from the gist of the present disclosure. For example, the shape of the projection lens 24 is not limited to the substantially hemispherical shape shown.

The invisible light source 36 is preferably turned on at a timing when the visible light source 34 is turned off, and the visible light source 34 is preferably turned on at a timing when the invisible light source 36 is turned off, but the present disclosure is not limited thereto. For example, there may be a turn-off timing of about 0.01 seconds between the timing at which the visible light source 34 is turned off and the timing at which the invisible light source 36 is turned on. In addition, as long as the unit substrate 32 is configured to suppress excessive heat generation, the invisible light source 36 may be continuously turned on.

In addition, the road surface drawing lamp unit 20 may be provided with two unit substrates, a unit substrate (not shown) to which the visible light source 34 is attached and a unit substrate (not shown) to which the invisible light source 36 is attached. Then, the same (common) shade 22 and projection lens 24, or two shades (not shown) and two projection lenses (not shown) provided for the respective unit substrates may be used to project the drawing pattern Bp, the drawing pattern Lp, or the like onto the road surface.

What is claimed is:

1. A vehicle display device comprising:
   a visible light source configured to repeatedly turn on and off to emit visible light;
   an invisible light source configured to emit invisible light; and
   a projection unit configured to project, as a drawing pattern, the visible light emitted from the visible light source and the invisible light emitted from the invisible light source onto a road surface.

2. The vehicle display device according to claim 1, wherein when a vehicle is traveling at a predetermined speed or higher, the invisible light source does not turn on even when the visible light source is off.

3. The vehicle display device according to claim 1, wherein when a vehicle is traveling at a predetermined speed or higher, the invisible light source does not turn on even when the visible light source is off.

4. The vehicle display device according to claim 1, wherein the visible light source and the invisible light source are mounted on a common substrate.

* * * * *